United States Patent [19]

Riniker et al.

[11] 3,862,113

[45] Jan. 21, 1975

[54] PROCESS FOR THE SELECTIVE ELIMINATION OF ARALKYLOXYCARBONYL AND TRITYL N-PROTECTING GROUPS WITH 2,2,2-TRIFLUOROETHANOL

[75] Inventors: Bernhard Riniker, Frenkendorf; Bruno Kamber, Basel; Peter Sieber, Reinach, all of Switzerland

[73] Assignee: Ciba-Geigy Corporation, Ardsley, N.Y.

[22] Filed: Sept. 18, 1973

[21] Appl. No.: 398,506

[30] Foreign Application Priority Data

Sept. 22, 1972 Switzerland.................. 13865/72

[52] U.S. Cl............................ 260/112.7, 260/112.5

[51] Int. Cl..... C07c 103/52, C07g 7/00, C08h 1/00
[58] Field of Search...................... 260/112.5, 112.7

[56] References Cited
OTHER PUBLICATIONS
Sieber et al., Helv. Chim. Acta, 51, 614–622, (1968).

*Primary Examiner*—Lewis Gotts
*Assistant Examiner*—Reginald J. Suyat
*Attorney, Agent, or Firm*—Joseph G. Kolodny

[57] ABSTRACT

A process for the selective elimination of amino protective groups in peptide synthesis, wherein the trityl group and/or an aralkyloxycarbonyl group such as the 2-(p-bi-phenylyl)-2-propyloxycarbonyl group is (are) split off in trifluorethanol at a pH of about 4 or 1, respectively.

10 Claims, No Drawings

PROCESS FOR THE SELECTIVE ELIMINATION OF ARALKYLOXYCARBONYL AND TRITYL N-PROTECTING GROUPS WITH 2,2,2-TRIFLUOROETHANOL

The problem of protective groups in peptide synthesis has not yet been satisfactorily solved. In particular, there is still a need for amino protective groups which can be split off selectively in acid medium. It is common knowledge that with sulphur-containing or very long chain peptides it is not possible to split off protective groups by hydrogenolysis; and the splitting off of protective groups in alkaline medium is also unsuitable with many sensitive peptides. Generally speaking, the best method of splitting off protective groups in peptide synthesis is by acidolysis. A number of very suitable groups are available for this purpose, in particular the tert. butyloxycarbonyl (Boc) group and similar groups, such as the tert. amyloxycarbonyl and the adamantyloxycarbonyl group for protecting the amino group, and corresponding esters and ethers, e.g. tert. butyl ester and tert. butyl ether, for protecting the carboxy and hydroxyl groups. Recently, moreover, a number of aralkyloxycarbonyl amino protective groups which are even easier to split off by acidolysis have become known, in particular the 2-(p-biphenylyl)-2-isopropyloxycarbonyl (Bpoc) group, cf. Sieber et al., Helv. Chim. Acta 51, 614–622 and Swiss Pat. No. 509,266. These groups can be split off selectively with respect to the Boc group and similar groups. A further amino protective group that can be split off selectively under mild acid conditions is the trityl group. This can be removed selectively with respect to the Boc group, but is has not yet proved possible to split it off selectively with respect to the Bpoc group. For example in 80% acetic acid, the rate of elimination of the trityl group is consequently only 7 times greater than that of the Bpoc group. This ratio does not suffice for a satisfactory separation of the protective groups. In order to attain a good selectivity (and thereby as few by-products as possible) the ratio of the rates of elimination should be at least 1:1,000. For Boc: Bpoc it is for example 1:3000 in the cited solvent. There is a need to have available at least three kinds of amino protective groups that can be split off selectively by acidolysis. The long-chain peptides that occur in nature consist partly of two chains, e.g. insulin. In the synthesis of such peptides there are required firstly protective groups for amino groups (and likewise for the carboxyl and hydroxyl groups) of the side chains that can be split off in acid medium; these groups are kept during the entire synthesis (so-called "stable" protective groups) and are split off only in the last step, or in the case of cystine-containing peptides optionally in the penultimate step. Suitable for this purpose are for example the Boc group and the corresponding tert. butyl ester und tert. butyl ether groups for protecting the carboxyl and hydroxyl groups of the side chains. Further, there is required a "labile" α-amino protective group for one of the two chains, e.g. the A-chain of insulin, that can be split off selectively with respect to these stable protective groups, and a second labile α-amino protective group for the second of the two chains, e.g. the B-chain of insulin, that in turn can be split off selectively with respect to this first labile amino protective group. These different kinds of labile α-amino protective groups are necessary because the synthesis of the two chains must proceed separately for both chains by repeated fusing on of amino acids or peptide fragments at the amino end of the chains, and the initially dormant chain requires a relatively more stable α-amino protective group than the chain in the process of being synthesised. Suitable labile amino protective groups e.g. with respect to the Boc group are the above mentioned aralkyloxycarbonyl groups or the trityl group. It has hitherto not been possible to split off these two kinds of labile amino protective groups with respect to each other.

The present invention is based on the observation that a good selective elimination by acidolysis of the N-trityl group with respect to a N-aralkyloxycarbonyl group of the formula I

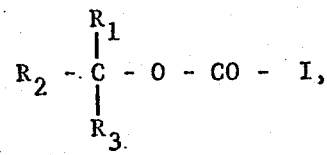

wherein $R_1$ represents lower alkyl, $R_2$ represents lower alkyl or phenyl and $R_3$ represents phenyl, and wherein the phenyl radicals are unsubstituted or substituted by lower alkyl, lower alkoxy, phenyl, lower alkylphenyl or lower alkoxyphenyl groups, is attained by splitting off the trityl group in 2,2,2-trifluoroethanol. It is possible to use absolute or aqueous, e.g. 70–100%, trifluoroethanol. Preferably 90–95% aqueous trifluoroethanol is used. The trityl group is split off in this solvent at a pH of 3 to 5. Preferably it is split off at pH 4 (measured with a glass electrode, "combined single-rod measuring chain" type EA 147X, Metrohm AG, Herisau, Switzerland) in about 5–10 minutes. The aralkyloxycarbonyl group remains unchanged under these conditions. It is split off only at a much stronger acid pH (at about 0 to 2). This corresponds to a rate of elimination of about 1000:1 for trityl to aralkyloxycarbonyl. The pH can be established with an inorganic or organic acid. It is possible to use therefore a mineral acid such as hydrohalic acid, e.g. hydrofluoric acid or preferably hydrochloric acid, or an organic acid e.g. formic acid, acetic acid, chloroacetic acid, or trifluoroacetic acid. The reaction can be carried out at temperatures from −50° to +60°C, preferably at room temperature.

In the aralkyloxycarbonyl group of the formula I the lower alkyl radical is preferably an ethyl or especially a methyl radical; $R_1$ and $R_2$ preferably represent methyl and $R_3$ represents phenyl, tolyl or p-biphenylyl. The aralkyloxycarbonyl group is e.g. the 1,1-diphenylethyloxycarbonyl group or above all the 2-phenylisopropyloxycarbonyl or 2-(p-tolyl)-isopropyloxycarbonyl or primarily the 2-(p-biphenylyl)-2-isopropyloxycarbonyl group.

If desired, the aralkyloxycarbonyl group can also be split off in trifluoroethanol. But it can also be split off in the known acid aqueous media, e.g. in aqueous formic acid, acetic acid or chloroacetic acid, or mixtures, e.g. glacial acetic acid/82.8% formic acid/water (7:2:1, parts by volume), cf. the literature cited hereinbefore.

The process according to the invention can be used in the synthesis of the two-chain peptides outlined hereinabove, for example in the following manner: The Boc group is used to protect the amino groups of the side chains and optionally, if desired, the tert. butyl ester and tert. butyl ether groups are used to protect carboxyl and hydroxyl groups; the α-amino group of the first chain (e.g. A-chain of insulin) is protected by the Bpoc group, the α-amino group of the second chain (B-chain) by the trityl group. In a partial sequence that contains fragments of both chains linked the B-chain is first completed by splitting off the trityl group at the amino end and fusing on trityl protected amino acids or peptide fragments. The aminoacid 1 of the B-chain is not protected by the trityl group but e.g. by the Boc group. Then the Bpoc group is eliminated from the A-chain, e.g. with 80% aqueous acetic acid, and Bpoc protected amino acids or peptide fragments are fused on at the amino end until the A-chain is completely synthesised. Finally, the side chain protective groups and both the α-amino protective groups are split off in a single step or, if desired, in several steps.

It is to be mentioned that three kinds of amino protective groups that can be split off selectively by acidolysis are useful not only in two chain peptides. They are also desired when a single chain peptide with several side chain amino groups, which are not substituted in the same manner, are to be manufactured, for example a peptide that is acylated at the ω-amino group of the side chain and that contains a further, yet free, side chain amino group.

Finally, it is to be noted that the process according to the invention can be used not only when three kinds of amino protective groups that can be split off selectively are required. On account of the easier and selective removability of the trityl and of the cited aralkyloxycarbonyl groups as compared with other known amino protective groups that can be split off selectively, it is advantageous to use both these protective groups in the synthesis of sensitive peptides, the trityl group being used as the labile and the aralkyloxycarbonyl group as the stable amino protective group.

It has further been found that the process of splitting off the N-trityl or N-aralkyloxycarbonyl group in trifluoroethanol at the corresponding pH (pH= 3–5, especially 4 for trityl; pH = 0–2 for aralkyloxycarbonyl can also be used with advantage in peptide synthesis if only one of these two amino protective groups is present, because this elimination is very simple and above all is very mild and does not attack the customary amino, hydroxy, carboxyl, mercapto and imino protective groups. It is therefore possible to split off the N-trityl or the N-aralkyloxycarbonyl group selectively in trifluoroethanol at the cited pH with respect to the groups of the tert. butyl type, e.g. Boc, tert. butyl ether, tert. butyl ester, and similar groups that can be split off by acidolysis, e.g. tert. amyloxycarbonyl, adamantyloxycarbonyl, cyclopentyloxycarbonyl and corresponding ethers and esters, or with respect to groups that can be split off by reduction or in bases, e.g. benzyloxycarbonyl and substituted benzyloxycarbonyl, such as nitro-, halogen, lower alkoxy —or phenylazo— substituted benzyloxycarbonyl and corresponding ethers and esters, such as benzyl ethers or esters, or 2,2,2-trichloroethyloxycarbonyl or N-acyl groups, such as formyl, trifluoroacetyl, phtaloyl, benzenesulphonyl, p-toluenesulphonyl, or ester groups, such as methyl, ethyl, benzoylmethyl ester, phenyl and substituted phenyl ester, such as trichlorophenyl, p-nitrophenyl, pentachlorophenyl, N-hydroxysuccinimide, N-hydroxyphthalimide or N-hydroxypiperidine esters, or with respect to mercapto protective groups, such as trityl, benzyl, p-nitrobenzyl, benzhydryl, dimethoxybenzhydryl, phenylcyclohexyl, etc. [Ber. 101, 681 (1968)], acylaminomethyl, e.g. acetylaminomethyl and the like [German Offenlegungsschrift 2,060,969 (Case 4-6914/1+2)], alkoxycarbonylsulphenyl, e.g. methoxycarbonylsulphenyl and the like [German Offenlegungsschrift 2,231,775 (Case 4-7613/1+2)], lower alkylthio, e.g. tert. butylthio, thiomethyl, such as tert. butylthiomethyl, benzylthiomethyl, or imino protective groups, such as benzyl, trityl, carbobenzoxy, adamantyloxycarbonyl, 2,2,2-trifluoro-1-tert. butyloxycarbonylaminoethyl, or 2,2,2-trifluoro-1-benzyloxycarbonylaminoethyl.

The starting materials for the above process, viz. peptides or peptide derivatives, in which one amino group is protected by the trityl group and one or more other amino groups are protected by the Bpoc group, are known or can be manufactured by methods which are known per se. The nature of the peptide or peptide derivative to be synthesised is of no consequence in the process according to the invention.

By peptides are meant primarily peptides that occur in nature, such as are described e.g. in "The Peptides" by Schröder and Lübke, Academic Press, New York and London, vols. I and II, 1965–1966, and also synthetic analogues of such peptides which differ from these in that in them one or more aminoacids are replaced by other aminoacids. By peptides are meant further partial sequences of the cited natural or synthetic peptides. Aminoacids that occur in the cited peptides as structural elements are chiefly the 20 code aminoacids, cf. for example Sci. American, October 1960, p. 55, and homologs, structural and optical isomers thereof, e.g. amino loweralkane acids with maximally 7 carbon atoms, which differ from the code aminoacids, such as α-aminobutyric acid, norvaline, β-alanine, γ-aminobutyric acid, α,β-diaminopropionic acid, also e.g. hydroxypyroline, normethionine, phenylglycine, ornithine, citrulline, O-methyl-tyrosine, N-methyltyrosine, and other N-lower alkyl amino acids, also racemic and D-aminocacids.

Derivatives of peptides which are possible starting or end products of the new process are chiefly functional derivatives, such as esters and amides, also peptides with protective groups. As esters, particular mention is to be made of those that are suitable intermediate products for the peptide synthesis, e.g. lower alkyl esters and halogen-substituted lower alkyl esters, e.g. methyl esters, ethyl esters, tert. butyl esters, tert. amyl esters, 2,2,2-trichloroethyl ester, 2-chloroethyl ester, also aryl and aryl-lower alkyl esters, such as phenyl or phenyl-lower alkyl esters which are substituted by lower alkyl, lower alkoxy, halogen, trifluoromethyl, or nitro, e.g. p-nitrophenyl ester, 2,4-dinitrophenyl ester, 2,4,6-trinitrophenyl ester, benzyl ester, p-nitrobenzyl ester, p-methoxybenzyl ester, also N-hydroxysuccinimide ester, N-hydroxyphthalimide ester. Amides are primarily N-unsubstituted and N-mono-lower alkyl and di-lower alkyl substituted amides.

The following Examples illustrate the process according to the invention.

The following systems are used in the thin-layer chromatography:

system 43: tert. amyl alcohol/isopropanol/water (51:21:28)

system 45: sec. butanol/3% aqueous ammonia (70:30)

system 52: n-butanol/glacial acetic acid/water (75:7.5:21)

system 87: isopropanol/formic acid/water (77:4:19)
system 100: ethyl acetate/pyridine/glacial acetic acid/water (62:21:6:11)

The following abbreviations are used:
Boc = tert. butyloxycarbonyl
Z = carbobenzoxy
Trt = trityl
But = tert. butyl
Bpoc = 2-(p-biphenylyl)-2-isopropyloxycarbonyl
DCCI = dicyclohexylcarbodiimide
HoBt = N-hydroxybenzotriazole
DMF = dimethyl formamide
OSu = N-hydroxysuccinimide ester
ONp = p-nitrophenyl ester
OPcp = pentachlorophenyl ester
OMe = methyl ester
$Et_3N$ = triethylamine

EXAMPLE 1

Selective elimination of the $N^\alpha$-trityl group in the human insulin fragment $A^{14-21}$-$B^{17-30}$ (I)

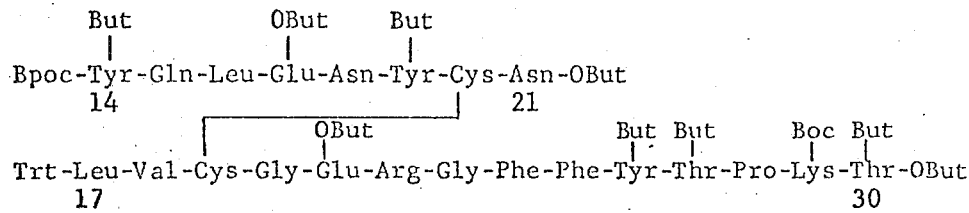

I (Thin-layer chromatogram of I on silica gel):

$Rf_{45} = 0.55$; $Rf_{52} = 0.76$; $Rf_{100} = 0.91$;
($CHCl_3$-$CH_3OH$ 8:2) = 0.38.

114 mg of I-acetate are dissolved in 0.6 ml. of chloroform/methanol (1:1) and the solution is added to 12 ml of trifluoroethanol/water (9:1, V:V). The reaction vessel is equipped with a glass electrode (Metrohm, type EA 147X) which is combined with an automatic pH-stat. Immediately upon addition of I the pH is adjusted to 4.5 by adding 0.05 normal HCl in 80% trifluoroethanol using the pH gauge. After about 15 minutes the acid consumption comes to a halt, which indicates that the elimination of the trityl group is terminated. This is confirmed by thin-layer chromatography (see below). 1 ml of pyridine is added to the solution and the batch is evaporated to dryness in vacuo and the residue is triturated with ether to remove triphenylcarbinol and trityl-trifluoroethyl ether, filtered, and dried.

In a thin-layer chromatogram on silica gel the residue (the des-trityl derivative of I, as hydrochloride) has the following Rf values:

| system | Rf |
|---|---|
| 45 | 0.49 |
| 52 | 0.59 |
| 100 | 0.60 |
| $CHCl_3$—$CH_3OH(8:2)$ | 0.25 |

The starting material can be manufactured as follows:

1. H-Lys(Boc)-Thr(But)-OBut 11.4 g of Z-Lys(Boc)-OH and 6.1 g of H-Thr(But)-OBut are dissolved in 170 ml of chloroform and the solution is treated at 0° C with 1.35 g of HoBt and 6.6 g of DCCI. After 22 hours at 4° C the precipitate is filtered off, and the filtrate is washed with 5% citric acid solution, 0,5 normal sodium bicarbonate solution, and water. Z-Lys(Boc)-Thr(But)-OBut is obtained after drying and evaporation. Rf in ethyl acetate= 0.60. The catalytic hydrogenation to H-Lys(Boc)-Thr(But)-OBut takes place in 200 ml of methanol in the presence of 1.0 g of palladium charcoal (10% Pd). Rf in chloroform/methanol (9:1) = 0.40.

2. H-Pro-Lys(Boc)-Thr(But)-OBut 1.58 ml of $Et_3N$ and 1.50 ml of isobutylchlorocarbonate are added at −10° C to 2.82 g of Z-Pro-OH in 50 ml of ethyl acetate. After 10 minutes at −10° C there are added 5.80 g of H-Lys(Boc)-Thr(But)-OBut in 50 ml of ethyl acetate. The batch is allowed to stand for 1 hour at −10° C and for 20 hours at 4° C and the solution is then washed with 5% citric acid, 0.5 normal bicarbonate solution and water, dried over sodium sulphate, and evaporated. The residue (Z-Pro-Lys(Boc)-Thr (But)-OBut) is recrystallised from ether/petroleum ether. Melting point: 100°–103° C. The benzyloxycarbonyl group is split off by hydrogenation in 100 ml of ethyl acetate in the presence of 0.5 g of palladium charcoal (10% Pd). Rf of the product in chloroform/methanol (7:3)= 0.45.

3. H-Thr(But)-Pro-Lys(Boc)-Thr(But)OBut 4.07 g of Z-Thr(But)-OSu and 5.57 g of H-Pro-Lys(Boc)Thr(But)-OBut are dissolved in 30 ml of ethyl acetate. After 24 hours at 20° C the mixture is diluted with 100 ml of ethyl acetate and the solution is washed with 5% citric acid solution, 0.5 N-sodium bicarbonate solution and water. Z-Thr(But)-Pro-Lys(Boc)-Thr(But) -OBut is obtained after drying and evaporation and is purified by recrystallisation from ether/petroleum ether. Rf in ethyl acetate = 0.35. H-Thr(But)-Pro-Lys(Boc)-Thr(But)-OBut is obtained by catalytic hydrogenation in 100 ml of methanol in the presence of 0.8 g of palladium charcoal (10% Pd). Rf in chloroform/methanol (9:1)= 0.20.

4. H-Tyr(But)-Tyr(But)-Pro-Lys(Boc)-Thr(But)-OBut 11.13 g of Z-Tyr(But)-OSu and 16.4 g of H-Thr(But)-Pro-Lys(Boc) -Thr(But)-OBut are reacted in 150 ml of ethyl acetate for 20 hours at 20° C. After dilution with 200 ml of ethyl acetate the solution is washed with 5% citric acid, 0.5 normal sodium bicarbonate solution and water, dried over sodium sulphate, and evaporated. Repreciptation from ethyl acetate/petroleum ether yields unitary Z-Tyr(But)-Thr(But)-Pro-Lys(Boc)-Thr(But)-OBut. Rf in ethyl acetate = 0.50. The catalytic hydrogenation to H-Tyr(But)-Thr(But)-Pro-Lys(Boc)-Thr(But)-OBut is carried out in 200 ml of methanol in the presence of 1.5 g of palladium charcoal (10% Pd). Rf in chloroform/methanol (4:1) = 0.55.

5. H-Phe-Tyr(But)-Thr(But)-Pro-Lys(Boc)-Thr(But)-OBut 2.65 g of Z-Phe-OSu and 5.95 g of H-Tyr(But)-Thr(But)-Pro-Lys (Boc)-Thr(But)-OBut are reacted in 30 ml of ethyl acetate for 20 hours at 20° C. The solution is then diluted with 70 ml of ethyl acetate, and washed with 5% citric acid, 0.5 normal sodium bicarbonate and water, dried over sodium sulphate, and evaporated. The product is purifed by chromatography on silica gel. Z-Phe-Tyr(But)-Thr(But)-Pro-Lys(Boc)-Thr(But)OBut is eluted with ethyl acetate in unitary form in a thin-layer chromatogram. Rf in ethyl acetate = 0.40. The hydrogenation to split off Z is carried out in 100 ml of methanol in the presence of 1.0 g of palladium charcoal (10% Pd.). Rf in chloroform/methanol (9:1) = 0.30.

6. H-Phe-Phe-Tyr(But)-Thr(But)-Pro-Lys(Boc)-Thr(But)OBut

As described under 5), 2.36 g of Z-Phe-OSu and 6.0 g of H-Phe-Tyr(But)-Thr(But)-Pro-Lys(Boc)-Thr(But)-OBut are reacted in 30 ml of ethyl acetate. The product is isolated and purified. Rf in ethyl acetate = 0.50. The catalytic hydrogenation of Z-Phe-Phe-Tyr(But)-Thr(But)-Pro-Lys(Boc)-Thr(But)-OBut is carried out in 60 ml of methanol in the presence of 0.8 g of palladium charcoal (10% Pd). Rf in toluene/acetone (1:1) = 0.45.

7. H-Arg-Gly-OMe.HCl 1.54 g of Z-Arg-OH and 0.63 g of H-Gly-OMe.HCl in 20 ml of DMF are treated at 0° C with 1.14 g of DCCI and the mixture is allowed to react for 15 hours at 20° C. The reaction mixture is filtered, the filtrate evaporated, and the residue is treated with 50 ml of water. The insoluble dicyclohexylurea is filtered off and the filtrate lyophilised. Rf in chloroform/methanol (1:1)= 0.50. The hydrogenation of Z-Arg-Gly-OMe.HCl is carried out in 30 ml of methanol in the presence of 0.5 g of palladium charcoal (10% Pd).

8. Z-Glu(OBut)-Arg-Gly-OMe.HCl 1.69 g of Z-Glu(OBut)-OH, 1.50g of H-Arg-Gly-OMe.HCl and 1.14 g of DCCI in 20 ml of DMF are reacted for 2 hours at 0° C and for 22 hours at 4° C. Insoluble product is filtered off, the filtrate is evaporated, and the residue is precipitated from methanol/ether. Rf in chloroform/methanol (1:1) = 0.50.

9. Z-Glu(OBut)-Arg-Gly-OH 12.02 g of Z-Glu(OtBu)-Arg-Gly-OMe.HCl in 50 ml of methanol and 30 ml of water are saponified with 2.0 normal NaOH at pH 11.4 (duration: 1¼ hours) at the pH-stat. A pH of 6.7 is established with normal hydrochloric acid, the methanol is evaporated, and the residue is kept for 20 hours at 0° C. The product is filtered off and dried over potassium hydroxide. Rf in the system 87 = 0.60.

10. H-Glu(OBut)-Arg-Gly-Phe-Phe-Tyr(But)-Thr(But)-Pro-Lys(Boc)-Thr(But)-OBut 1.025 ml of 2.15 normal HCl in ethyl acetate, 2,40 g of H-Phe-Phe-Tyr-(But)-Thr(But)-Pro-Lys(Boc)-Thr(But)-OBut, 0.1 g of HoBt and 0.45 g of DCCI are added at 0° C to 1.11 g of Z-Glu(OBut)-Arg-Gly-OH in 30 ml of DMF. After 2 hours at 0° C and 20 hours at 20° C the mixture is filtered and the filtrate is evaporated. The residue is purified by a countercurrent distribution in the system MeOH,buffer,chloroform,carbon tetrachloride (10 + 3 + 5 + 4) [buffer: 38.6 g of ammonium acetate and 52.7 ml of glacial acetic acid are bulked with water to 2 litres]. K = 0.3. Rf in system 43 = 0.55. There is obtained Z-Glu(OBut) -Arg-Gly-Phe-Phe-Tyr(But)-Thr(But)-Pro-Lys(Boc)-Thr(But)-OBut. The benzyloxycarbonyl group is split off by hydrogenation in 50 ml of 90% methanol in the presence of 0.2 g of palladium charcoal (10% Pd). Rf in system 100 = 0.30.

11. H-Asn-Tyr(But)-OMe 7.75 g of Z-Asn-ONp and 5.0 g of H-Tyr(But)-OMe are reacted for 15 hours in 60 ml of DMF at 20° C. The solution is then evaporated, the residue dissolved in 50 ml of methanol, and precipitated with 300 ml of ether. The precipitate is recrystallised from methanol. Melting point: 173°–175° C. The catalytic hydrogenation of Z-Asn-Tyr(But)-OMe is carried out in 400 ml of methanol in the presence of 3.0 g of palladium charcoal (10% Pd). Rf in chloroform/methanol (4:1) = 0.40.

12. H-Glu(OBut)-Asn-Tyr(But)-OMe 1.85 g of Z-Glu(OBut)-ONp and 1.49 g of H-Asn-Tyr(But)-OMe are reacted in 30 ml of DMF for 24 hours at 20° C. The isolation of Z-Glu(OBut)-Asn-Tyr(But)-OMe is carried out as in (11).Recrystallisation from isopropanol.Melting point:192°–195° C.The catalytic hydrogenation is carried out in 100 ml of methanol in the presence of 0.2 g of palladium charcoal (10% Pd). Rf in chloroform/methanol (7:3) = 0.45.

13. H-Leu-Glu(OBut)-Asn-Tyr(But)-OMe 0.97 g of Z-Leu-ONp and 1.34 g of H-Glu(OBut)-Asn-Tyr(But)-OMe are reacted in 5 ml of DMF for 20 hours at 20° C. 50 ml of ether are added to the reaction solution. The mixture is filtered and the residue, Z-Leu-Glu(OBut)-Asn-Tyr(But)-OMe, is washed with ethyl acetate. Rf in chloroform/methanol (9:1)= 0.50. Z is split off by catalytic hydrogenation in 60 ml of methanol in the presence of 0.2 g of palladium charcoal (10% Pd). Rf in chloroform/methanol (7:3) = 0.60.

14. H-Gln-Leu-Glu(OBut)-Asn-Tyr(But)-OMe 0.60 g of Z-Gln-ONp and 0.99 g of H.Leu-Glu(OBut)-Asn-Tyr(But)-OMe are reacted in 10 ml of DMF for 15 hours at 20° C. The product, Z-Gln-Leu-Glu(OBut)-Asn-Tyr(But)-OMe is precipitated from the reaction solution by addition of ether, and then re-crystallised from hot methanol. Melting point: 229°–231° C. The catalytic hydrogenation is carried out in 30 ml of trifluoroethanol in the presence of 0.15 g of palladium charcoal (10%), the pH being kept at 4.5 with 0.7 normal HCl in methanol using a pH-stat. Rf in system 100 = 0.35.

15. Bpoc-Tyr(But)-Gln-Leu-Glu(OBut)-Asn-Tyr(But)-OMe 4.85 g of Bpoc-Tyr(But)-OPcp and 5.56 g of HCl.H-Gln-Leu-Glu (OBut)-Asn-Tyr(But)-OMe are treated in 40 ml of DMF with 0.94 ml of ET$_3$N and the mixture is reacted for 20 hours at 20° C. The reaction solution is then evaporated and the residue is purified by reprecipitation from methanol/ether. Rf in chloroform-/methanol (4:1) = 0.65.

16. Bpoc-Tyr(But)-Gln-Leu-Glu(OBut)-Asn-Tyr(But)-NH-NH$_2$ 2.5 g of the methyl ester are dissolved in 30 ml of DMF and the solution is treated at 0° C with 3.0 ml of hydrazine hydrate. After 16 hours the product is precipitated by addition of 200 ml of water, filtered off, and dried over potassium hydroxide. Rf in chloroform-/methanol (7:3)= 0.60.

17.

Bpoc-Tyr(But)-Gln-Leu-Glu(OBut)-Asn-Tyr(But)-Cys-Asn-OBut
｜
Trt-Leu-Val-Cys-Gly-OH     (II)

1.87 g of Bpoc-Tyr(But)-Gln-Leu-Glu(OBut)Asn-Tyr(But)-NH-NH₂ are dissolved in 15 ml of DMF and the solution is treated at −15° C with 1.3 ml of 2.84 normal HCl in ethyl acetate and 0.208 ml of tert. butylnitrate. After 10 minutes at −15° C there are added 1.52 g of

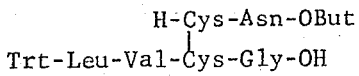

(cf. Belgian Pat. No. 785,933, Case 4-7613/1+2) and 1.0 ml of N-ethylmorpholine in 15 ml of DMF. After 1 hour at −10° C and 15 hours at 4° C the solution is poured at 0° C into 150 ml of 1% acetic acid, the precipitate is filtered off and purified by countercurrent distribution in the system methanol/0.1 m-ammonium acetate (pH 7)/chloroform/carbon tetrachloride (10:3:5:4).K = 0.3. Rf in system 45 = 0.60.

18.

Bpoc-Tyr(But)-Gln-Leu-Glu(OBut)-Asn-Tyr(But)-Cys-Asn-OBut
                                                          |
Trt-Leu-Val-Cys-Gly-Glu(OBut)-Arg-Gly-Phe-Phe-Tyr(But)-

Thr(tBu)-Pro-Lys(Boc)-Thr(But)-OBut 4.28 g of II and 3.56 g of H-Glu(OBut)-Arg-Gly-Phe-Phe-Tyr (But)-Thr(But)-Pro-Lys(Boc)-Thr(But)-OBut in 60ml of DMF are treated with 0.4 g of HoBt and 2.06 g of DCCI and the mixture is kept for 2 hours at 40° C. The reaction solution is then concentrated to about 30 ml, filtered, and poured into 250 ml of water. The precipitate is filtered off and purified by countercurrent distribution in the system methanol/0.1 m-ammonium acetate (pH7)/chloroform/carbon tetrachloride (10:3:5:4).K = 0.06.Rf in system 45 = 0.55.

EXAMPLE 2

A compound of the formula I is used as starting material as in Example 1, but in which the Bpoc protective group is replaced by the 2-phenylisopropyloxycarbonyl group. The corresponding des-trityl peptide is obtained in the same manner as in Example 1. In a thin-layer chromatogram on silica gel it has the following Rf values:

Rf ₄₅ = 0.47 (trityl protected product: 0.53);
Rf₁₀₀ = 0.60 (trityl protected product: 0.90);
Rf in CHCl₃—CH₃OH (8:2) = 0.24 (trityl protected product: 0.37).

EXAMPLE 3

Selective Elimination of Bpoc From Bpoc-Ser(But)-Thr(But)-Cys(Trt)-Val-Leu-OMe 0.61 g of Bpoc-Ser(But)-Thr(But)-Cys(Trt)-Val-Leu-OMe (cf. British Pat. No. 1,259,017) are dissolved in 10 ml of trifluoroethanol/water (9:1, v/v). A pH of 0.5 is established with 0.05 normal HCl in trifluoroethanol/water (4: 1, v/v) and kept thereat by means of the pH-stat. When no more acid is taken up (after about 40 minutes) 1 ml of pyridine is added, the solution is evaporated, and the residue is triturated with ether, yielding a product which in unitary in a thinlayer chromatogram: H-Ser(But)-Thr (But)-Cys(Trt)-Val-Leu-OMe; Rf in chloroform/acetone (1:1) = 0.50.

EXAMPLE 4

Selective Elimination of N-Trt From Trt-Leu-Val-Cys(Trt)-Gly-OMe 1.2 g of Trt-Leu-Val-Cys(Trt)-Gly-OMe (cf. Belgian Pat. No. 785,933) are taken up in 100 ml of trifluoroethanol/water (9:1, v/v). The solution is adjusted to pH 4.0 with 0.05 normal HCl in trifluoroethanol/water (4:1, v/v and kept thereat by means of the pH-stat. Upon completion of acid uptake (after about 20 minutes) 2 ml of pyridine are added and the solution is evaporated. The residue, H-Leu-Val-Cys(Trt)-Gly-OMe, is triturated with ether and proves to be unitary in a thin-layer chromatogram. Rf in toluene/acetone (1:1) = 0.45.

We claim:

1. A process for the selective elimination of amino protective groups in peptide synthesis using the trityl group and an aralkyloxycarbonyl group of the formula I

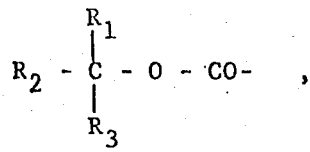

in which R₁ represents lower alkyl, R₂ represents lower alkyl or phenyl and R₃ represents phenyl, and in which the phenyl radicals are unsubstituted or substituted by lower alkyl, lower alkoxy, phenyl, lower alkylphenyl, or lower alkoxyphenyl, wherein the trityl group is split off in 2,2,2-trifluoroethanol at a pH of 3 to 5.

2. A process for the selective elimination of amino protective groups in peptide synthesis, wherein as amino protective group there is used the trityl group and wherein this group is split off in 2,2,2-trifluoroethanol at a pH of 3 to 5.

3. A process for the selective elimination of amino protective groups in peptide synthesis, wherein as amino protective group there is used an aralkyloxycarbonyl group of the formula I

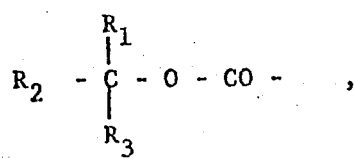

in which R₁ represents lower alkyl, R₂ represents lower alkyl or phenyl and R₃ represents phenyl, and in which the phenyl radicals are unsubstituted or substituted by lower alkyl, lower alkoxy, phenyl, lower alkylphenyl, or lower alkoxyphenyl, and wherein this group is split off in 2,2,2-trifluoroethanol at a pH of 0 to 2.

4. A process as claimed in claim 1, wherein 70–100% trifluoroethanol is used.

5. A process as claimed in claim 1, wherein as aralkyloxycarbonyl group there is used a group of the formula I, in which $R_1$ and $R_2$ represent methyl, and $R_3$ represents phenyl, tolyl, or p-biphenylyl.

6. A process as claimed in claim 1, wherein the 2-phenylisopropyloxycarbonyl group is used as aralkyloxycarbonyl group.

7. A process as claimed in claim 1, wherein the 2-(p-biphenylyl)-2-isopropyloxycarbonyl group is used as aralkyloxycarbonyl group.

8. A process as claimed in claim 1 for the synthesis of two-chain peptides, wherein partial sequences of each chain are linked together, the α-amino group of the one chain is protected by the trityl group and the α-amino group of the other chain is protected by an aralkyloxycarbonyl group of the formula I, in which $R_1$, $R_2$, and $R_3$ have the indicated meanings, and wherein the trityl group is split off in trifluoroethanol and the chain in question is completed by fusing on trityl protected aminoacids or peptide fragments and splitting off the trityl group each time in trifluoroethanol.

9. A process as claimed in claim 8, wherein the 2-(p-biphenylyl)-2-isopropyloxycarbonyl group is used as aralkyloxycarbonyl group.

10. A process as claimed in claim 8, wherein partial sequences of insulin are synthesised.

* * * * *